Oct. 6, 1953    M. B. EPSTEIN    2,654,097
DRAIN FITTING FOR WASH SINKS AND THE LIKE
Filed Dec. 18, 1950

INVENTOR
*Maurice Epstein*
BY
*William F. Nickel*
ATTORNEY

Patented Oct. 6, 1953

2,654,097

UNITED STATES PATENT OFFICE 2,654,097

DRAIN FITTING FOR WASH SINKS AND THE LIKE

Maurice B. Epstein, Brooklyn, N. Y.

Application December 18, 1950, Serial No. 201,336

4 Claims. (Cl. 4—291)

My invention is an improved drain fitting with sieve attached for screening out particles of food, grease and the like; particularly a drain fitting which can readily be used with wash sinks in kitchens and similar establishments.

An important object of this invention is to provide a simple and inexpensive fitting that can be easily installed and removed, and of such design that the sieve can be quickly taken out when necessary for cleaning or replacement.

The nature of the invention is clearly set forth hereinafter, and the construction thereof is illustrated in the accompanying drawings. But while I show the invention in one or more preferred forms, I do not wish to be limited to the exact details of design shown herein, as variations in structure may be adopted without alteration of the principal characteristics of the device.

Figure 2:
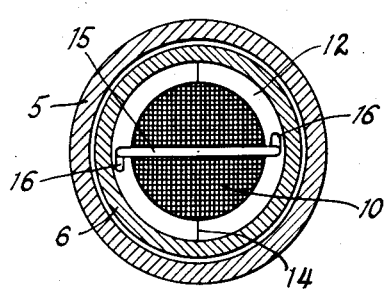
Figure 2 is a cross section on line 2—2 of Figure 1.

The numeral 1 indicates a portion of a sink in a kitchen or the like, the sink having a drain outlet 2, with an inside shoulder 3. On this shoulder rests an external flange 4 at the upper end of a drain pipe 5. The pipe 5 of course is often connected to the sink by means of screw threads, welding and other methods.

The fitting in which my invention is embodied includes a tubular member 6, such as a short length of pipe; and united thereto at one is a sleeve 7; which can also be a short piece of pipe; the member 6 and the sleeve having screw threads 8 so that the member and sleeve can be readily joined by screwing them together, with the end of the member 6 enveloping the sleeve. The inner end of the fitting thus presents an inside supporting shoulder 9 formed by the inner end of the sleeve 7, and supports a sieve 10 made of a circular piece of wire mesh to strain out particles of food and grease that otherwise might collect in the drain 5 and after a time obstruct it.

Figure 1:
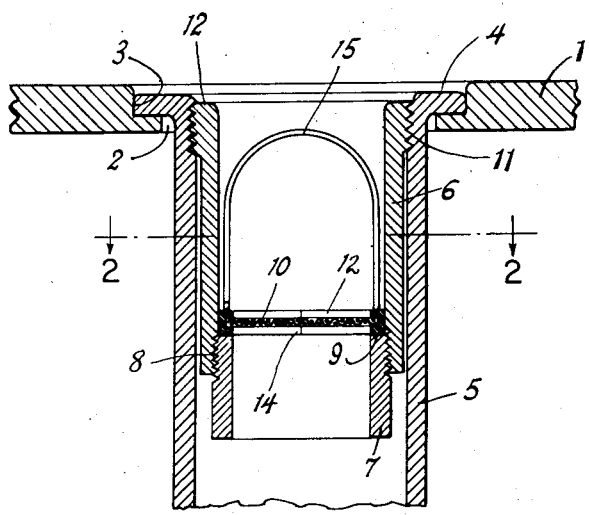
Figure 1 is a longitudinal sectional view of a fitting according to this invention.
Figure 3:
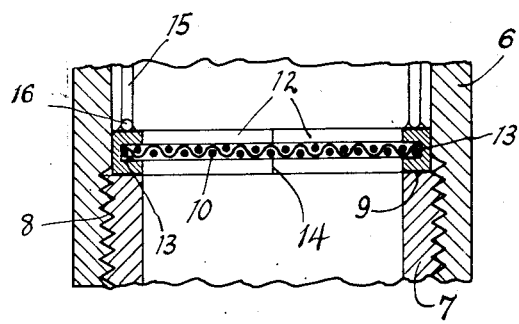
Figure 3 is an enlarged sectional detail.

The fitting is supported in the pipe 5 at the outlet 2 by screwing it into place. The upper end of the member 6 has a slightly increased outside diameter with screw threads thereon; and the inside of the pipe 5 within the flange 4 has matching threads; as indicated at 11. The fitting, with or without the sieve 10 in place, can simply be inserted into the pipe and turned till it is tight in the position shown in Figure 1. Whenever it needs to be taken out, it is turned in the reverse direction by hand till the threads 11 are disengaged. Thus ordinary sinks can be easily adapted for use with the fitting merely by threading the drain pipe 5 at the junction of the sink 1 and the pipe 5, with the threads on the inside of the pipe.

The sieve 10 is mounted in a ring 12 that has a groove 13 around its inner edge to seat the outer edge of the piece of mesh 10. Affixed to the top of the ring 12 is a bail 15, made of a piece of resilient wire with its ends welded or otherwise made fast to the ring 12. The ring is of a diameter that fits easily inside the member 6, but it is split at the ends of a diameter between the ends of the bail 15, as illustrated at 14. Therefore, when the ring and sieve are in place with the ring holding the sieve, and the ring in contact with the shoulder 9, the ring 12 will be held together with the ends in contact, by the member 6; but the ring and sieve can be pulled out by the bail 15. Being resilient, the bail will allow the halves of the ring 12 to be separated so that the sieve can be removed and cleaned or replaced. The ring and sieve are then put back into the member 6, and the fitting is then ready for further use. The bail, when the ring 12 engages the shoulder 9, is wholly within the fitting, and never interferes with the washing of dishes therein. The bail is connected to the top of the ring by bent ends 16 welded to the ring 12.

Figure 4:
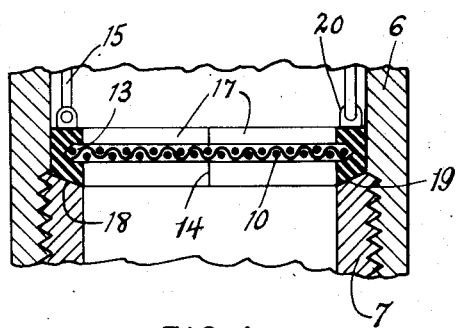
Figure 4 is a similar detail of a modification.

The shoulder may be either perpendicular to the inside of the member 6, or bevelled. The ring 12 can be of metal or other material such as hard rubber 17, as shown in Figure 4. Here the lower side of the ring 17 is bevelled as shown at 18, and makes contact with a bevelled shoulder or seat 19 on the sleeve 7. The ends 16 of the bail are inserted into recessed lugs 20 on the ring.

The fitting is thus simple, inexpensive to make, practical and efficient in operation. It can be used with any conventional sink, readily installed, always kept in service, and easily removed.

Having described my invention, what I believe to be new is:

1. A fitting for insertion into the drain pipe of a wash sink, comprising a tubular member, having outside threads at one end to engage internal threads on said pipe at the outlet of said sink, a sleeve at the opposite end of said member having one end enveloped by said member and presenting an internal shoulder therein facing the first-named end, a transverse sieve, a ring engaging said shoulder and having a groove around its inner edge receiving the periphery of said sieve, said ring consisting of two separate halves with abutting ends, and a bail for said member having its ends affixed one to each half of the ring.

2. A fitting for insertion into the drain pipe of a wash sink, comprising a tubular member, having outside threads at one end to engage internal threads on said pipe at the outlet of said sink, a sleeve at the opposite end of said member having one end enveloped by said member and presenting an internal shoulder therein facing the first-named end, a transverse sieve, a ring engaging said shoulder and having a groove around its inner edge receiving the periphery of said sieve, said ring consisting of two separate halves with abutting ends, and a bail for said member having its ends affixed one to each half of the ring, said ends being bent to extend in the direction of the circumference of the ring.

3. The fitting as defined in claim 2, wherein the ends of the bail are affixed to the halves of the ring by welding.

4. The fitting according to claim 2, wherein the halves of the ring have perforated lugs, and the ends of the bail are attached to the lugs.

MAURICE B. EPSTEIN.

References Cited in the file of this patent

UNITED STATES PATENTS

| Number | Name | Date |
|---|---|---|
| 948,900 | McKim | Feb. 8, 1910 |
| 1,014,223 | Hunsicker | Jan. 9, 1912 |
| 2,073,899 | Luther | Mar. 16, 1937 |